United States Patent Office.

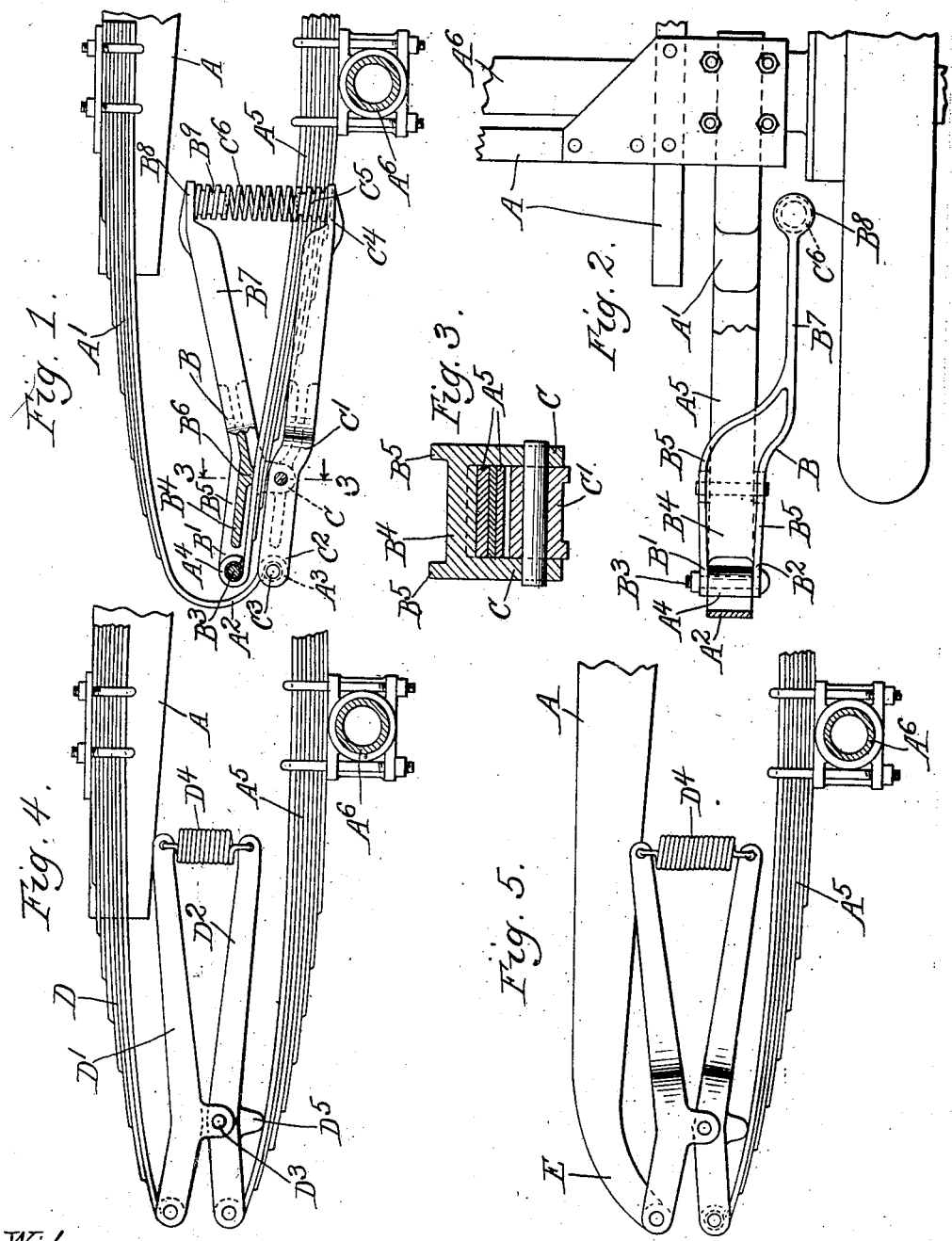

LEWIS P. HALLADAY, OF STREATOR, ILLINOIS.

SHOCK-ABSORBER.

1,240,441.

Specification of Letters Patent.

Patented Sept. 18, 1917.

Application filed November 15, 1915. Serial No. 61,467.

*To all whom it may concern:*

Be it known that I, LEWIS P. HALLADAY, a citizen of the United States, residing at Streator, in the county of La Salle and State of Illinois, have invented a certain new and useful Improvement in Shock-Absorbers, of which the following is a specification.

My invention relates to improvements in shock absorbers or auxiliary spring suspensions for motor vehicles and the like. It has for one object to provide an auxiliary spring suspension which may be used in connection with the usual type of automobile or motor vehicle. Another object is to provide such an auxiliary spring suspension as will be easily and conveniently attached and render it in proper operative condition at all times, and such as will require no special arrangement or adjustment to render it operative in connection with the ordinary type of motor vehicles.

My invention is illustrated more or less diagrammatically in the accompanying drawings, wherein—

Figure 1 shows a section through an automobile rear axle, with parts omitted and parts broken away, showing a three-quarter elliptical spring in part elevation and my device in position thereon in part section.

Fig. 2 is a plan of the parts shown in Fig. 1 with parts omitted and parts broken away.

Fig. 3 is a section along the line 3—3 of Fig. 1 and

Fig. 4 is a side elevation showing a modified form of my device attached to a full elliptical spring.

Fig. 5 shows such a form attached to a semi-elliptical spring.

Like parts are indicated by like letters throughout the several figures.

A represents the motor vehicle's chassis frame. On this chassis frame is anchored the quarter elliptical spring $A^1$ having a scroll end $A^2$. This scroll end is provided at its terminus with a spring bolt eye $A^3$ located immediately below a similar eye $A^4$ on the one-half elliptical spring $A^5$, which one-half elliptical spring is supported at an intermediate point on the axle $A^6$. In the ordinary automobile spring construction there will be a link connecting the end of the scroll quarter spring and the end of the half elliptical spring. In my device, however, I dispense with the link and substitute therefor the pair of levers as shown.

The lever B is forked as at $B^1$ $B^2$, to lie on either side of the spring bolt eye $A^4$, and is connected thereto by spring bolt $B^3$. The lever, as it extends forwardly, is made up of a flat plate $B^4$ bounded on either side by flanges $B^5$, and it is these flanges which extended, form the forks $B^1$ $B^2$. A rib $B^6$ on the lower side of the plate furnishes a bearing point on the upper surface of the spring $A^5$, slightly behind the pivotal connection of the lever on the spring. The purpose of this bearing rib is of course to steady the lever and prevent it wabbling about its pivotal point. The arrangement of the parts is such that the lever always rests on the rib as a fulcrum. Immediately beyond the point $B^6$ the flanges $B^5$ are bent outwardly as indicated in Fig. 2. The plate $B^4$ decreases in width and finally the lever terminates in a single arm $B^7$ having at its end a spring platform $B^8$ with a lug $B^9$.

Pivot lugs C depend downwardly from the flanges $B^5$ on the lever B on either side of the spring $A^5$ extending enough below it to permit a pivot connection between the lugs C and a similar lever $C^1$. This lever is forked at $C^2$ to engage a spring bolt $C^3$ which passes through the forks and through the spring bolt eye $A^3$ on the end of the scroll. This lever $C^1$ also extends outwardly and rearwardly to terminate in a similar spring platform $C^4$ with lugs $C^5$, the coil spring $C^6$ being guided by the lugs $C^5$ and $B^9$, and being compressed between the platforms $B^8$ and $C^4$.

It will be noted that in this arrangement, a downward pressure of the body and chassis is applied through the scroll spring so that the connection between the end of the auxiliary spring and the end of the semi-elliptical spring on the axle is under tension, that is to say, the tendency is for the lower end of the scroll to pull away downwardly from the semi-elliptical spring. This, of course, tends to compress the coil spring $C^6$ owing to the resultant rotation of the levers about their mutual pivot axis.

In the modified form shown in Fig. 4 we have two springs wherein the scroll is absent and the end of the spring D, which directly supports the chassis is immediately above instead of being below this spring $A^5$. In this case the connection between the ends of the two springs is under compression and so the two levers $D^1$ $D^2$, which are pivoted at $D^3$ and connected at their ends respectively to the springs D and A⁵, tend to rotate in an opposite direction. The pressure tends to bring the two rearward ends of these levers together and the spring D⁴ is therefore in tension as is the spring C⁶ under compression. In order to guide and position these levers, a lug D⁵ is provided which rests on the spring A⁵ so that the lever D² is as shown in Fig. 4, held by the spring A⁵ firmly against clockwise rotation about its pivot axis on the spring. The weight of the parts and the load carried by the lever of course prevents all counter-clockwise movement in exactly the same manner as such movement is prevented in the arrangement shown in Fig. 1.

In Fig. 5 the same general arrangement is shown except that in this case the frame member E is carried out in place of the spring D, and the levers are interposed between the semi-elliptic spring and the rigid frame member E.

It will be evident that while I have shown in my drawings an operative device, still many changes might be made both in size, shape and arrangement of parts without departing from the spirit of my invention and I wish, therefore that my drawings be regarded as in a sense diagrammatic.

The use and operation of my device is as follows:

It is of course well understood that the ordinary type of flat leaf spring used in automobile and motor vehicle suspension has manifest limitations. If the flat spring is made powerful enough to carry the weight of the vehicle and protect the parts from direct road shocks, the spring becomes so powerful that it is insensitive or substantially insensitive to minor shock or vibration. In so far as these minor shocks are concerned, the spring operates as a rigid member. If you make it so flexible that it does not so operate, then it is not strong enough to adequately support the load under circumstances of greater stress.

It has been proposed to remedy this difficulty by interposing between the motor vehicle and the axle, some where in the spring suspension, a coil spring with indirect tension or indirect compression. This coil spring may be made more flexible, and having a different range of vibration it tends to overcome the difficulty, but since the full load must be supported by this coil spring, the spring itself must be a comparatively rigid and heavy structure and the same defects are found in it in a lesser degree to be sure than are found in connection with the heavy leaf spring.

The levers which in my invention are interposed between the spring members or between the spring member and the chassis frame permit the use of a lighter, more flexible auxiliary spiral spring. The result is that as a vehicle passes over a bump or obstruction, this light spring freely gives, and the occupants of the vehicle are protected from the shock. The two levers as provided furnish a predetermined and prearranged anchorage for both ends of the spring. This spring may be in compression or in tension, but in any event, as soon as these two levers are pivoted together, and as soon as one end is pivoted on the spring or on the axle, and the other is pivoted on the frame or on a spring on the frame, the parts are always in a certain predetermined general relation. The fulcrum rib on one of the levers where it rests on the axle supported spring effectually prevents flopping about or random movement of the levers. They are held in one general plane by the stiff axle supported spring, and they are free to rock under the loads applied to them by the weight of the body and chassis. The ratio of the long to the short lever arm is about five to one though the ratio might be different and vary with the peculiarities of the vehicle or service at the will of the operator or erector. If it is 5 to 1 instead of having for instance a 500 pound spring, you can use between the lever arm ends a 100 pound spring. Such a spring is of course much more flexible and much more responsive, and one great advantage of the lever arrangement is that such a spring may be used.

It will be clear that under certain circumstances, the spring between the lever ends must be in compression and under other circumstances it must be in tension, but in any event it is proposed that these levers be so arranged that the varying loads applied to them as the vehicle passes over the road irregularities tend to rotate the one with respect to the other and the yielding means tend yieldingly to rotate the other.

I claim:

1. A road vehicle having a supporting axle, a flat leaf spring resting thereon, a lever pivoted at one end on the spring, a stop between the lever and the spring adjacent its end, a scroll leaf spring, a vehicle body suspended thereon, the end of the scroll being located immediately beneath the end of the flat leaf spring, a lever having its end pivoted on the scroll, said levers being pivoted together immediately adjacent the stop, and a yielding member interposed between the free ends of the levers.

2. A road vehicle having a supporting axle, a flat leaf spring resting thereon, a lever pivoted at one end on the spring, a scroll leaf spring, a vehicle body suspended thereon, the end of the scroll being located immediately beneath the end of the flat leaf spring, a lever having its end pivoted on the scroll, said levers being pivoted together beneath the flat spring, and a yielding member interposed between the free ends of the levers, one lever being located above and the other below the flat spring.

3. A road vehicle having a supporting axle, a flat leaf spring resting thereon, a lever pivoted at one end on the spring, a stop between the lever and the spring adjacent its end, a scroll leaf spring, a vehicle body suspended thereon, the end of the scroll being located immediately beneath the end of the flat leaf spring, a lever having its end pivoted on the scroll, said levers being pivoted together immediately adjacent the stop, and a yielding member interposed between the free ends of the levers, and said levers being for a portion of their length interposed in line with the springs and offset beyond the pivotal point to bring the yielding member into a position at one side of said springs.

4. A road vehicle having a supporting axle, a flat leaf spring resting thereon, a lever pivoted at one end on the spring, a scroll leaf spring, a vehicle body suspended thereon, the end of the scroll being located immediately beneath the end of the flat leaf spring, a lever having its end pivoted on the scroll, said levers being pivoted together beneath the flat spring, and a yielding member interposed between the free ends of the levers, and said levers being for a portion of their length interposed in line with the springs and offset beyond the pivotal point to bring the yielding member into a position at one side of said springs, one of said levers being located above, the other below the flat spring.

5. A road vehicle comprising a flat supporting spring, a lever pivoted at one end thereon, a stop on the lever engaging and resting on the upper edge of the spring, the lever being beyond the stop bent upwardly away from and outwardly to one side of the spring, lugs depending downwardly from such lever on the side of the spring below the stop, a lever pivoted in said lugs, said lever being bent outwardly to one side of the spring substantially beneath the first lever, a yielding member interposed between the free end of said levers and a connection between opposed end of said second lever and the vehicle body.

6. A road vehicle having a supported axle, a flat leaf spring resting thereon, a lever pivoted at one end on the spring, a stop on the lever resting on the spring, a second lever pivoted on the first along a line in a plane normal to the levers and containing the stop, a pivot connection between such lever and the vehicle body, and a yielding connection interposed between the free ends of the lever.

In testimony whereof, I affix my signature in the presence of two witnesses this 9th day of November, 1915.

LEWIS P. HALLADAY.

Witnesses:
   Fred C. Bestian,
   M. B. Ryon.